United States Patent Office 3,505,426
Patented Apr. 7, 1970

3,505,426
EPOXY RESINS CURED WITH ALPHA-HALO
POLYCARBOXYLIC POLYANHYDRIDES
Satoshi Matsumoto, Tadashi Sudo, Etsuo Tanaka, Kenichi Abe, and Akihiro Sato, Yokohama-shi, Japan, assignors to Chisso Corporation, Osaka, Japan
No Drawing. Filed July 5, 1967, Ser. No. 651,153
Int. Cl. C08g *45/00, 45/06*
U.S. Cl. 260—830      3 Claims

ABSTRACT OF THE DISCLOSURE

Curable composition comprising an alicyclic epoxide and a curing agent which is selected from the group consisting of (a) a polymeric polyanhydride of a saturated dicarboxylic acid having 6 to 10 carbon atoms and at least one halogen substituent at the α-position (referred to hereinafter as α-halo-$C_6$–$C_{10}$-dicarboxylic acid); (b) a mixture of said polymeric polyanhydride of α-halo-$C_6$–$C_{10}$-dicarboxylic acid and a polyol; and (c) a reaction product of said polymeric polyanhydride of α-halo-$C_6$–$C_{10}$-dicarboxylic acid and a polyol, these curing agents being effective at ordinary temperatures for the curing of alicyclic epoxides.

---

This invention relates to curable compositions. Particularly, it relates to curable compositions comprising an epoxy compound and a dicarboxylic acid derivative as a curing agent therefor.

Various compounds have been proposed and some of them have been used as curing agents for epoxy compounds. However, there have been few curing agents capable of performing so-called "normal (or room) temperature curing." Particularly, any normal temperature curing has never succeeded regarding alicyclic epoxides among epoxy compounds.

It is an object of the present invention to provide a normal temperature curing agent for epoxy compounds, particularly for alicyclic epoxides. It is another object of the invention to provide a curing agent of low volatility, liquid form at room temperature and strong acidity. It is a further object of the invention to provide a curable composition of epoxy compound usable as a powerful adhesive.

After extensive studies on normal temperature curing agents for epoxy compounds, particularly alicyclic epoxides, it has been found that α-halo-derivatives of specified saturated aliphatic dicarboxylic acids having 6 to 10 carbon atoms of from, that is, adipic, pimelic, suberic, azelaic and sebaic acid, are excellent curing agents.

These compounds are those in which halogen atom or atoms are substituted for at least one hydrogen atom attached to methylene group in the α-position relative to carboxylic group. Among di- or more-substitutes, there can be two types of α, α and α, α', the former being obtained from the substitution for two hydrogen atoms attached to the same carbon atom and the latter being obtained from the substitution for hydrogen atoms attached to different carbon atoms. As examples of the α-halo-dicarboxylic acids, there may be mentioned α-monochloro dicarboxylic acid, α,α-dichloro dicarboxylic acid, α,α'-dichloro dicarboxylic acid, α,α,α'-trichloro dicarboxylic acid, α,α,α',α'-(tetrachloro dicarboxylic acid, etc. However, these compounds may not always be desirable as normal temperature curing agents for epoxy compounds since their melting points are so high, whereas compounds having desirable properties in that respect are poly(α-halo-dicarboxylic acid) poly anhydrides. The molecular weights of these polyanhydrides are too difficult to be determined. Presumably they would be below about 30 monomer-units. Other preferable compounds are a mixture of or a condensation product between said α-halo-dicarboxylic acid and polyol.

Briefly, the curable compositions of the present invention comprise (1) curable compositions composed of a (a) an alicyclic epoxide and (b) a polymeric polyanhydride of an α-halo-dicarboxylic acid [referred to hereinafter as poly(α-halo-dicarboxylic acid) poly-anhydride] having a constituting unit of the general formula, $$-O.CO.CX_2.(CH_2)_n.CX_2.CO-$$

wherein X is hydrogen or a halogen atom and at least one of the X atoms is a halogen and $n$ is an integer of from 2 to 6 (inclusive), (2) curable compositions composed of said (a), said (b) and (c) a polyol; and (3) curable compositions composed of said (a) and a reaction product of said (b) and said (c).

As halogen contained in poly(α-halo-dicarboxylic acid) polyanhydride and reaction products of poly(α-halo-dicarboxylic acid) polyanhydride, chlorine is usually preferable, while bromine also may be employed. A α-bromo-dicarboxylic acid can afford a flame resistance to cured materials.

The ratio of the curing agents to be used is usually from 0.2 to 1.0 acid equivalent per one epoxy equivalent. Applicable polyols are generally those which can co-exist with epoxy compounds in curing, said polyols being capable of eventually giving flexibility, adhesive property, etc. to the cured products. Examples of these polyols include ethylene glycol, propylene glycol, polyethylene glycol, polypropylene glycol, butanediol, hexamethylene glycol, glycerol, 1,2,6-hexane triol, trimethylol propane, sorbitol, polyesterpolyol, polycaprolactone polyl and the like. The present curing agents are particularly effective in their applications to the alicyclic epoxides. Although normal temperature curing of the bisphenolic epoxides with amines has so far been possible, normal temperature curing of alicyclic epoxides has been to date impossible by means of any kind of known curing agents. The use of the curing agents of the present invention has not only made possible normal temperature curing but also our curing agents are characterized by the fact that the bonding strength resulting from the use of our compositions in adhesives is markedly higher than that of normal temperature curing adhesive of bisphenolic epoxides with amines. To cite examples of such alicyclic epoxy compounds, there may be mentioned: 3' 4'-epoxy-6'-methyl-cyclohexylmethyl-3,4-epoxy-6-methylcyclohexane carboxylate; 3,4'-epoxycyclohexylmethyl-3,4-epoxycyclohexane carboxylate; vinylcyclohexene dioxide; dicyclopentadiene dioxide, alicyclic diepoxyacetal or the like. The comparison between poly(α-halo-dicarboylic acid) polyanhydride and condensation products between said polyanhydrides and polyols is made as follows: The former have a comparatively longer pot life, but approx. 80% of curing is considered to be practically completed within 7 days. In particular, oily mixtures can be easily obtained therefrom even at room temperature. Thus, the former have preferable properties for normal temperature curing. However, they have, at the same time, the disadvantage of hygroscopicity in curing, particularly in the curing of a coating film. On the other hand, the latter (said condensation products) have melting points varying in accordance with kinds of polyols, (mostly, 20–40° C.), but they are soluble in epoxy compounds and usable even in the presence of a small amount of water. In this case, the addition thereto of a tertiary amine such as benzyldimethyl amine, 1-benzyl-2-ethyl-imidazole or the like or, tin octanoate or the like can make the curing velocity greater. The amines make the velocity greater by accelerating hydrolysis of the anhydride to acid.

As for the above-mentioned hygroscopicity, an antimoisture additive such as paraffin can be also incorporated in the present compositions. Alternatively, a film such as polypropylene, polyethylene or the like film may be put on the present compositions.

Processes for preparing compounds to be used as the curing agents will be briefly described hereinafter.

Poly($\alpha$-halo-dicarboxylic acid) poly anahydrides can be prepared by heating a dicarboxylic acid with acetic anhydride, halogenating the resultant poly (dicarboxylic acid) poly anhydrides with a halogenating agent such as chlorine, sulfuryl chloride or the like, treating the resultant halides with water and treating the resultant $\alpha$-halodicarboxylic acids with acetic anhydride; or directly by heating the above-mentioned resultant halides in the atmosphere of nitrogen. The latter direct heating process necessitates a long time and further, coexistence of acid chlorides can be observed. When such acid chlorides exist in a large amount, the physical properties of the cured products will be degraded. Therefore, there should be used the polyanhydrides containing acid chlorides in such an amount that the determined chlorine content of the latter may be less than 10% of the total amount of the poly anhydrides containing acid chlorides. The final products thus obtained are mainly composed of acid anhydrides, and the content of said acid anhydrides in said final products can be quantitatively determined by means of alkaline titration and the quantitative determination method for anhydrides using aniline. (Analytical Chemistry, vol. 23, p. 1717, 1951.)

Another method for preparing poly ($\alpha$-halo-dicarboxylic acid) poly anhydrides comprises converting dicarboxylic acid to the acid chloride thereof (for example, boiling point of adipic acid chloride: 103–105° C./2 mm. Hg) by means of thionyl chloride or the like, chlorinating said acid chloride by phosphorus pentachloride or the like to convert it into dichloro-dicarboxylic acid chloride (for example, B.P. of dichloroadipic acid chloride: 95–97° C./2 mm. Hg), and hydrolyzing said acid chloride to form dichlorodicarboxylic acid (for example, dichloro adipic acid having a melting point of 120° C.), followed by heating said dichlorodicarboxylic acid with acetic anhydride. The structure of the final product can be identified as $\alpha,\alpha$-dichloro derivative in accordance with N.M.R.

When an $\alpha$-halo-azelaic acid group or a $\alpha$-halo-sebacic acid group is used in the present compositions, relatively flexible cured materials can be obtained compared with those from the use of a $\alpha$-halo-adipic acid group, while the curing velocity in the use of the former is the same as that in the use of the latter and further the former enables curing at a low temperature.

When a poly (dicarboxylic acid) polyanhydride (not poly ($\alpha$-halo-dicarboxylic acid) polyanhydride) such as poly (adipic acid) polyanhydride, poly (azelaic acid) polyanhydride or poly (sebacic acid) polyanhydride is used as a curing agent for an epoxy compound such as 3′,4′-epoxy-cyclohexylmethyl - 3,4 - epoxycyclohexanecarboxylate, the epoxy compound in which the polyanhydride is incorporated in an amount of 60–70 phr. (weight parts per 100 parts of epoxy compound) can not be cured even when it is heated at 100° C. for 3 hours, and only a soft reaction product is obtained in 5–6 hours.

The compositions of the present invention are compatible with unsaturated polyester resins, the adhesive property of which can be improved by incorporating therein the present compositions. The present compositions are also compatible with polyester plasticizers, and so water-resistance of cured materials containing the present compositions can be improved by incorporating therein a polyester plasticizer.

The curing reaction with the curing agents of the present invention will be illustrated in the following examples. Examples 1–31 relate to $\alpha$-halo-adipic acid group. Examples 32–37 relate to $\alpha$-halo-azelaic or sebacic acid group.

EXAMPLE 1

To 27 g. of 3′,4′-epoxy cyclohexylmethyl-3,4-epoxy cyclohexane carboxylate were added and mixed therewith 6 g., 12 g. and 18 g., of poly (dichloroadipic acid) poly anhydrides, respectively. The mixtures were poured into shaping molds comprising glass plates with 0.3 cm. thick spacers inserted therebetween.

The poly (dichloroadipic acid) poly anhydrides used in the above process were prepared by reacting adipic acid with acetic anhydrides to form poly (adipic acid) poly anhydrides; chlorinating said anhydrides with 2 mol equivalents of chlorine gas; recrystallizing the chlorides thus produced by adding water thereto, whereby a crystal having M.P. 184° C. and consisting of 96% of $\alpha,\alpha$-dichloroadipic acid and 4% of $\alpha$-monochloroadipic acid as determined by gas chromatographic analysis as the methylester thereof was obtained; and heating said crystals with 3 mol equivalents of acetic anhydride to obtain the polyanhydrides containing 88% of anhydride.

About one hour later, any of the poured materials gelatinized, and lost their fluidities. Shaped articles after allowing to stand at 30° C. for 7 days showed thermal deformation temperatures of 55° C., 60° C. and 57° C., respectively, and their heat reductions in weight after being heated at 200° C. for 24 hours were 0.9%, 1.5% and 2.4%, respectively.

Upon adhering two aluminum plates to each other by using the above-mentioned mixtures as a bonding agent, adhesion strength after allowing to stand at room temperature for 4 days were all within the range of 55–59 kg./cm.² at room temperature. The strength increased with temperature increase and yet showed 65 kg./cm.² even at 180° C.

EXAMPLE 2

To 27 g. of 3′,4′-epoxy cyclohexylmethyl-3,4-epoxy cyclohexene carboxylate were added 6 g., 12 g., and 18 g. of poly (chloroadipic acid) poly anhydrides and the mixtures were treated in the same way as in Example 1. The poly (chloroadipic acid) poly anhydrides were prepared by chlorinating poly (adipic acid) poly anhydrides with 1.8 mol equivalents thereto of chlorine gas, and heating the resulting chlorination product with stirring at 80–120° C. for 10 hours in a current of nitrogen gas. The poly (chloroadipic acid) poly anhydrides contained 87% of anhydride part and acid chlorides, the determined chlorine content of which is 0.8% of the total amount of the polyanhydrides containing acid chlorides.

Upon the quantitive determination after treating said chlorination product with methanol, it was proved by vapor phase chromatography that the resultant substances were composed of 3.3% of adipic acid, 39.4% of $\alpha$-monochloroadipic acid and 57.3% of dichloroadipic acid.

About 30 minutes later, any of the first-mentioned mixtures gelatinized and lost their fluidities. The shaped articles after being allowed to stand at room temperature for 4 days showed thermal deformation temperatures of 49° C., 61.5° C. and 64° C. respectively, and their heat reductions in weight after being heated at 200° C. for 24 hours were 1.0%, 2.4% and 3.5%, respectively.

EXAMPLE 3

To 27 g. of 3′,4′-epoxy cyclohexylmethyl-3,4-epoxy cyclohexane carboxylate were added 12 g. of poly (chloroadipic acid) poly anhydrides, and the mixture was treated in the same way as in Example 1. The used poly (chloroadipic acid) poly anhydrides were prepared in the same way as in Example 2, except that the heating time was 4 hours, and the determined chlorine content of acid chlorides was 5% of the total amount of the polyanhydrides containing acid chlorides.

The shaped article after being allowed to stand at room temperature for 4 days showed thermal deformation temperature of 45° C. and the heat reduction in weight after being heated at 200° C. for 24 hours was 3.8%.

EXAMPLE 4

To 27 g. of 3′,4′-epoxycyclohexylmethyl-3,4-epoxy cyclohexane carboxylate were added 12 g. of poly (chloroadipic acid) poly anhydrides and the mixture was treated in the same way as in Example 1. The poly (chloroadipic acid) poly anhydrides were prepared by chlorinating poly (adipic acid) poly anhydrides with 1 mol equivalent thereto of chlorine gas, and by heating the chlorinated product for 16 hours in a current of nitrogen gas to carry out dehydrochlorination. The determined chlorine content of acid chlorides present in the polyanhydrides was 1% of the total amount of the polyanhydrides containing acid chlorides. Upon the quantitative determination after treating said chlorination product with methanol, it was proved that the resultant substances were composed of 31% of adipic acid, 64% of monochloroadipic acid, and 15% of dichloroadipic acid.

The time up to the gelation was about 30 minutes, and the time needed for reaching a stage where the produced resin, as touched by the fingers, no longer remained sticky was as long as 3 hours. The shaped article after being allowed to stand at room temperature for 4 days showed a thermal deformation temperature of 55° C.

EXAMPLES 5–12

To 71 g. of 3′,4′-epoxy cyclohexylmethyl-3,4-epoxy cyclohexane carboxylate was added 30.6 g. of poly (dichloroadipic acid) poly anhydrides which was employed in Example 1, and the mixture was then poured into a shaping mold comprising glass plates with 0.3 cm. thick spacers inserted therebetween which were treated with a mold releasing agent. The material thus poured gelatinized in about 30 minutes. Shaped articles were made under various curing conditions and their thermal deformation temperatures were measured. The results are shown in the following table.

EXAMPLE 13

To 30 g. of 3′,4′-epoxy-6′-methylcyclohexylmethyl-3,4-epoxy-6-methylcyclohexane carboxylate was added 12 g. of poly (dichloroadipic acid) poly anhydrides which was used in Example 1, and one hour later the surface of the thus produced resin proved no longer sticky. The shaped article after being allowed to stand at room temperature for 4 days had a thermal deformation temperature of 56° C.

An alicyclic diepoxyacetal having the following formula:

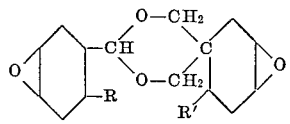

(CY 175, trademark of Ciba Co.) was employed in place of the above-mentioned epoxide. 20 g. of CY 175 and 12 g. of poly (dichloroadipic acid) polyanhydride were used. The mixture was cured at 30° C. for 24 hours. The resultant cured material had a Shore-D hardness of 87.

EXAMPLE 14

To a mixture of 21.6 g. of 3′,4′-epoxy cyclohexylmethyl-3,4-epoxy cyclohexane carboxylate and 9.6 g. of epoxidized soy bean oil having an epoxy equivalent of 207 was added 10.2 g. of poly (dichloroadipic acid) poly anhydrides used in Example 1. A cured resin was obtained 3 hours later, which was no longer sticky. The thermal deformation temperature of the cured product after being allowed to stand at 30° C. for 3 days was 36° C. The cured product was further subjected to post-curing of two hours at 80° C. and further, to two hours at 120° C. A flexible cured product having a thermal deformation temperature of 61° C. was obtained. The cured product obtained at room temperature from epoxidized soy bean oil and the acid anhydrides had a thermal deformation temperature of 20° C. This product was further subjected to postcuring of two hours at 80° C. and further, to two hours at 120° C. to produce a soft, resinous cured product having a thermal deformation temperature of 30° C.

EXAMPLE 15

Poly (adipic acid) poly anhydrides were chlorinated with 1.8 mol equivalents of chlorine gas, and the chlorination product thus obtained was added dropwise into and reacted with 300 cc. of acetone solution containing 0.1 mol equivalent of glycerol and 0.1 mol equivalent of diethylene glycol, followed by removal of the solvent and hydrochloric acid under a reduced pressure. 16 g. of the mixture thus obtained containing ester carboxylic acid was mixed with 27 g. of 3′,4′-epoxy cyclohexylmethyl-3,4-epoxy cyclohexane carboxylate, and the mixture was poured into a shaped mold composed of glass plates to obtain a cured product. Half day later, the curable composition was cured and lost its fluidity. The thermal deformation temperature of the shaped product after subjected to curing at room temperature for 4 days was 45 C.

The system in which 0.1% of benzyldimethylamine was incorporated, gave a faster curing velocity and was no longer sticky 3 hours later.

TABLE 1

| | Example 5 | Example 6 | Example 7 | Example 8 | Example 9 | Example 10 | Example 11 | Example 12 |
|---|---|---|---|---|---|---|---|---|
| Curing conditions: | | | | | | | | |
| Room temp., 30° C | 3 days | 4 days | 7 days | 14 days | 3 days | 3 hours | 3 hours | |
| Heating temp., 80° C | | | | | | 2 hours | 2 hours | |
| Heating temp., 120° C | | | | | | 10 hours | 10 hours | 3 hours |
| Thermal deformation temp., ° C | 51 | 54 | 61 | 64 | 97 | 140 | 120 | 130 |

EXAMPLE 16

A mixture of 27 g. of 3′,4′-epoxy cyclohexylmethyl-3,4-epoxy cyclohexane carboxylate, 10.2 g. of poly (dichloroadipic acid) poly andydrides, and 1.2 g. of glycerol was brought into a shaping mold composed of glass plates to obtain a shaped product. The time needed until the fluidity of the mixture was no longer observed, was within 10 minutes and the time needed until the surface of the resin was no longer sticky, was less than 30 minutes. The thermal deformation temperature of the shaped product 3 days after the commencement of curing was 56° C., while that of the shaped product which was allowed to stand at room temperature for 3 hours, and then subjected to post-curing of 2 hours at 80° C. and further, to 2 hours at 120° C., increased to 119° C.

EXAMPLES 17–20

The same curing as in Example 16 was carried out, except that the glycerol used in Example 16 was replaced by the following polyols. The results obtained are shown in the following table, where the conditions for the curing at room temperature and the post-curing are the same as those of Example 16. The polyol component enhances the curing velocity, even if it is so small in amount.

TABLE 2

| Polyol | Amount of polyol used, g. | Thermal deformation temperature of cured product at room temperature, °C. | Thermadeformation temperature of post-cured product °C. |
|---|---|---|---|
| Examples: | | | |
| 17_____ 1,2,6-hexane triol_____ | 1.8 | 57 | 99 |
| 18_____ Diethylene glycol_____ | 2.1 | 59 | 118 |
| 19_____ Triethylene glycol_____ | 3.0 | 58 | 101 |
| 20_____ Polypropylene glycol____ (OH equivalent=200)___ | 4.0 | 45 | 75 |

EXAMPLES 21-24

A given amount of polypropyleneglycol (OH-equivalent—200; used initiator—glycerine) was added to 50 g. of poly-(dichloro adipic acid) polyanhydride, and the resultant mixture was heated in the presence or absence of tin octanoate to produce a curing agent.

A mixture of 30 g. of the curing agent thus obtained and 50 g. of 3',4'-epoxycyclohexylmethyl-3,4-epoxycyclohexanecarboxylate was coated uniformly and thinly on a glass or a steel plate (about 5 mil thick). The coating was cured at 18° C. for 3 days to form a film adhering onto the substrate plate.

It was dipped into boiling water for one hour or 5% aqueous sodium chloride solution at room temperature for a week to carry out a test for resistance for boiling water or aqueous sodium chloride solution, whereby changes of each of the coated films were observed.

In these tests, a coated film which had not been fully cured produced white turbidity, swelling or stripping, whereas there was observed no such change for fully cured film. Moreover, no heat evolved during the curing of the coated film, and curing could be carried out at 18° C. exactly. The results obtained are shown in the following table.

TABLE 3

| | Example | | | |
|---|---|---|---|---|
| | 21 | 22 | 23 | 24 |
| Conditions for producing curing agents: | | | | |
| Polypropyleneglycol, grams_____ | 50 | 50 | 50 | 25 |
| Tin octanoate, gram_____ | | | 0.1 | 0.1 |
| Reaction temperature, °C_____ | 80 | 80 | 60 | 50 |
| Reaction time, hour_____ | 3 | 3 | 2 | 3 |
| Tin octanoate for curing (g.)_____ | | 0.1 | | |
| Water resistant test: | | | | |
| Resistance to boiling water_____ | (1) | (2) | (2) | (2) |
| Resistance to aqueous sodium chloride solution_____ | (3) | (3) | (2) | (2) |

[1] Whitely turbid, small stripping, swelling.
[2] No change.
[3] Whitely turbid, large swelling.

EXAMPLES 25-27

Curable compositions consisting of 50 g. of 3',4'-epoxycyclohexylmethyl - 3,4 - epoxycyclohexanecarboxylate and given amounts of poly-(dichloroadipic acid)-polyanhydride were cured in the presence or absence of a catalyst, and tests for the cured films were carried out in the same way as in Examples 21-24. The results are shown in the following table.

TABLE 4

| | Example | | | |
|---|---|---|---|---|
| | Ref. | 25 | 26 | 27 |
| Polyanhydride, gram_____ | 25 | 15 | 20 | 30. |
| Catalyst, gram_____ | | Tin-octanoate, 0.05 | Zinc acetate, 0.25 | Amine[1], 0.5. |
| Water resistant test: | | | | |
| Resistance to boiling water_____ | Soluble, large stripping | Small stripping | No change | Small stripping. |
| Resistance to aqueous sodium chloride solution | Large stripping | No change | do | No change. |

[1] 1-benzyl-2-ethyl-imidazole.

EXAMPLES 28-31

To 42 g. of poly adipic acid polyanhydride heated to 100° C. and melted, was added dropwise 118 g. of bromine with stirring over 8 hours, and the heating was continued at the temperature for 1.5 hours. To dibromoadipic acid bromide thus obtained was added about 20 cc. of water to hydrolyze it. Filtration yielded 98 g. of dibromo-adipic acid. 100 g. of dibromo-adipic acid together with 300 g. of acetic anhydride were refluxed with heating for 4 hours, followed by the distilling off of acetic anhydride and acetic acid. 90 g. of poly-(dibromo-adipic acid) polyanhydride was obtained. Mixtures of 60 g. or 80 g. of the resultant polyanhydride and 100 g. of 3',4'-epoxycyclohexylmethyl-3,4-epoxycyclohexanecarboxylate to which, if necessary, 0.1 to 0.2 equivalent of glycerine was added, were cured at room temperature or on heating. Each of the cured materials thus obtained were observed to have self fire-extinguishability in the examinations carried out according to ASTM D635–56T. Other physical properties are shown in the following table.

TABLE 5

| Example No. | Polyanhydride, grams | Glycerine, equivalent | Heat deformation temperature, °C. | | Reduced amount in heating; percent, 200° C., 24 hours | Increased weight percent in dipping | |
|---|---|---|---|---|---|---|---|
| | | | Room temp., 7 days | 100° C. one hour | | 30% sulfuric acid, 7 days | Water, 7 days |
| 28_____ | 60 | | 63 | 108 | 2.29 | 0.49 | 1.40 |
| 29_____ | 80 | | 63.5 | 102 | 2.91 | 0.52 | 1.77 |
| 30_____ | 60 | 0.1 | 64 | 99 | 1.78 | 0.38 | 1.23 |
| 31_____ | 60 | 0.2 | 63 | 92 | 1.76 | 0.39 | 1.38 |

EXAMPLE 32

175 g. of poly-azelaic acid polyanhydride (the content of the anhydride is 97%), was heated to 100° C. with stirring, and 2 mols of chlorine gas was blown therethrough. 270 g. of α-chloro-azelaic acid chloride was obtained. 20 g. of water was added to 100 g. of the acid chloride to hydrolyze the latter, whereby 88 g. of α-chloro-azelaic acid crystal wa sobtained.

250 cc. of acetic anhydride was added to 80 g. of the α-chloro-azelaic acid and the mixture was heated under refluxing for 5 hours. Distilling off of acetic anhydride and acetic acid from the reaction mixture gave 71 g. of poly (α-chloroazeraic acid) polyanhydride (the content of the anhydride is 92.6%). Treatment thereof with a large amount of methanol gave easily α-chloro-azelaic-acid dimethyl ester, which was observed to have the following composition from the vapor phase chromatographical analysis:

| | Percent |
|---|---|
| Azelaic acid unit | 1.4 |
| α-monochloro-azelaic acid unit | 2.7 |
| α,α'-dichloro-azelaic acid unit | 95.9 |

A mixture of 15 g. of poly (α-chloroazelaic acid) polyanhydride having the above-mentioned composite units and 30 g. of 3',4'-epoxycyclohexylmethyl-3,4-epoxycyclohexanecarboxylate was poured into a shaping mold of glass plates with 0.3 cm. thick spacers inserted therebetween. It was allowed to stand at room temperature. About 5 hours later, it gelatinized, and seven days later, a flexible cured material having a heat deformation temperature of 48° C. was obtained. Reduced amount of the cured material on heating at 200° C. for 24 hours and weight increase thereof in dipping in 30% sulfuric acid for seven days were 4.0% and 0.71%, respectively. A material produced by a post-curing for an additional hour had a heat deformation temperature of 79° C. A material cured at 100° C. gelatinized in 40 minutes, and two hours later, it had a heat deformation temperature of 52° C.

EXAMPLES 33–35

A system consisting of the poly (chloro-azelaic acid) polyanhydride and an epoxy compound used in Example 32 and glycerine as a polyol, was subjected to curing. The results obtained are shown in the following table. Heat-resistance tests of the cured materials (reduced amounts in heating) and acid-resistance tests thereof (weight increase) were carried out under the same conditions as in Example 33.

TABLE 6

| | Epoxy compound, grams | Polyan hydride, grams | Glycerine, grams | Heat deformation temperature ° C. | | Reduced amount in heating, percent | Weight increase with sulfuric acid, percent |
|---|---|---|---|---|---|---|---|
| | | | | Room temp., 7 days | Post-curing, 100° C. one hour | | |
| Example: | | | | | | | |
| 33 | 30 | 16 | 1 | 51 | 62 | 0.57 | 0.62 |
| 34 | 30 | 16 | 2 | 48 | 56 | 0.56 | 0.59 |
| 35 | 30 | 16 | 5 | 45 | 50 | 0.59 | 0.59 |

Each surface hardnesses (Shore–D) of the materials cured after one day at room temperature was 70 to 80. The curing velocities of the system of these examples proved to be faster compared with that of a system which is the same excepting that glycerine is not incorporated. The hardness of the cured material without glycerine was 40.

EXAMPLE 36

460 g. of poly sebacic acid polyanhydride was heated to 110° C. and melted. About 5 mols of chlorine gas was then blown therethrough to make α-chloro-sebacic acid chloride. The addition of 40 cc. of water thereto caused it to hydrolyze evolving hydrogen chloride. 1.5 l. of acetic anhydride was added to the hydrolyzate. After the mixture was heated at 90° C. for one hour, it was rapidly concentrated by means of a rotary evaporator. 640 g. of poly (α-chloro sebacic acid) polyanhydride (the anhydride content was 88%) was obtained.

100 g. of the epoxy compound used in Example 32 was added to 50 g. of the polyanhydride thus obtained. After curing at 100° C. for two hours, the resultant cured material showed a heat deformation temperature of 32° C. Curing of the same composition at room temperature for 7 days yielded a cured material having a heat deformation temperature of 30° C.

EXAMPLE 37

20 g. of GP 600 which is a polypropyleneglycol initiated by glycerine and has a molecular weight of 600, was added to 62.5 g. of poly (α-chloro sebacic acid) polyanhydride used in Example 36, and the mixture was reacted at 80° C. for one hour. To 20 g. of the resultant reaction product was then added 20 g. of the epoxy compound used in Example 32, and the mixture was reacted at first at 18° C. for 48 hours, and further at 100° C. for one hour. A flexible cured material having a heat deformation temperature of 42° C. was obtained.

What is claimed is:
1. A curable composition comprising
   (a) an alicyclic compound having at least two epoxy groups per molecule, and
   (b) a curing agent selected from the group consisting of a polymeric polyanhydride of a saturated dicarboxylic acid having between 6 and 10 carbon atoms having a constituting unit of the general formula

—O.CO.CX$_2$.(CH$_2$)$_n$.CX$_2$.CO— wherein
   (1) X is either hydrogen or a halogen atom, at least one of the X atoms being a halogen atom, and
   (2) n is an integer from 2 to 6,
   the amount of the curing agent being in the ratio of from 0.2 to 1.0 carboxy groups per epoxy group.

2. A curable composition comprising
   (a) an alicyclic compound having at least two epoxy groups per molecule,
   (b) a curing agent selected from the group consisting of a polymeric polyanhydride of a saturated dicarboxylic acid having between 6 and 10 carbon atoms having a constituting unit of the general formula —O.CO.CX$_2$(CH$_2$)$_n$.CX$_2$.CO— wherein
   (1) X is either hydrogen or a halogen atom, at least one of the X atoms being a halogen atom, and
   (2) n is an integer from 2 to 6, and
   (c) a polyol,
   the amount of the curing agent being in the ratio of from 0.2 to 1.0 carboxy groups per epoxy group.

3. A curable composition comprising (a) an alicyclic compound having at least two epoxy groups per molecule, and
(b) the reaction product of a polyol and a compound selected from the group consisting of a polymeric polyanhydride of a saturated dicarboxylic acid having between 6 and 10 carbon atoms having a constituting unit of the general formula —O.CO.CX$_2$(CH$_2$)$_n$.CX$_2$.CO— wherein
(1) X is either hydrogen or a halogen atom, at least one of the X atoms being a halogen atom, and
(2) $n$ is an integer from 2 to 6, the amount of the curing agent being in the ratio of from 0.2 to 1.0 carboxy groups per epoxy group.

References Cited

UNITED STATES PATENTS

| | | | |
|---|---|---|---|
| 2,324,483 | 7/1943 | Castan | 260—830 |
| 3,328,483 | 6/1967 | Enthoven | 260—830 |
| 3,420,785 | 1/1969 | Marcus | 260—47 |

OTHER REFERENCES

Black, R. G. et al., Plastics Technology, March 1964, pp. 37–40.

MURRAY TILLMAN, Primary Examiner

P. LIEBERMAN, Assistant Examiner

U.S. Cl. X.R.

260—47.2, 78.4, 537, 539